United States Patent
Hoarau et al.

(10) Patent No.: US 9,007,626 B2
(45) Date of Patent: Apr. 14, 2015

(54) COLLECTING DATA FOR A PRINT SERVICE PROVIDER

(75) Inventors: Eric Hoarau, San Francisco, CA (US); Jun Zeng, Sunnyvale, CA (US); Scott Clearwater, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 13/450,998

(22) Filed: Apr. 19, 2012

(65) Prior Publication Data

US 2013/0278963 A1  Oct. 24, 2013

(51) Int. Cl.
*G06K 15/00*  (2006.01)
*G06Q 10/06*  (2012.01)

(52) U.S. Cl.
CPC ........................................ *G06Q 10/06* (2013.01)

(58) Field of Classification Search
None
See application file for complete search history.

(56) References Cited

U.S. PATENT DOCUMENTS

| 7,546,609 | B2 * | 6/2009 | Florissi et al. ................. 719/318 |
| 7,676,294 | B2 | 3/2010 | Baier et al. |
| 7,764,280 | B2 * | 7/2010 | Shiina ............................ 345/204 |
| 7,912,694 | B2 * | 3/2011 | Bobok et al. .................... 703/16 |
| 7,953,681 | B2 | 5/2011 | Rai |
| 8,126,762 | B2 * | 2/2012 | Ramachandran et al. ... 705/7.28 |
| 2005/0065830 | A1 * | 3/2005 | Duke et al. ........................ 705/7 |
| 2005/0209841 | A1 | 9/2005 | Arning et al. |
| 2006/0224440 | A1 | 10/2006 | Rai |
| 2007/0070379 | A1 | 3/2007 | Rai et al. |
| 2007/0124182 | A1 | 5/2007 | Rai |
| 2008/0103743 | A1 | 5/2008 | Howell et al. |
| 2008/0183458 | A1 * | 7/2008 | Bobok et al. .................... 703/17 |
| 2008/0285067 | A1 | 11/2008 | Rai |
| 2010/0095246 | A1 | 4/2010 | Shepherd |

\* cited by examiner

*Primary Examiner* — Ashish K Thomas
(74) *Attorney, Agent, or Firm* — Dierker & Associates

(57) ABSTRACT

A non-transitory, computer-readable medium has embedded therein instructions executable by a processor. The instructions simulate an operation of a print service provider (PSP) using a model of a printing system with a set of operation parameters for performing the PSP operation. The instructions determine a monitoring strategy based on the simulated PSP operation. The monitoring strategy is for monitoring the PSP operation when performed in the printing system.

18 Claims, 3 Drawing Sheets

US 9,007,626 B2

COLLECTING DATA FOR A PRINT SERVICE PROVIDER

BACKGROUND

Print-service-providers (PSPs) are business operations for printing. PSPs may have production systems that include monitoring, collecting, and storing data to provide continuous operation. Some systems for monitoring, collecting, and storing data use trial-and-error to determine time and location for collection of a minimum set of data.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to print service providers.

Examples of the method and system disclosed herein provide use of a simulation platform for improving data collection in a print-service-provider (PSP). PSP operations may be modeled as a system having many sources of information and control points to manage. It is to be understood that, as used herein, a PSP may include an individual PSP or a network of PSPs. Changing to a digital infrastructure across a PSP production plant and network may include developing new, or renovating pre-existing, production management systems. Product, part, and equipment status and tracking are examples of operational information used in management and control of a PSP. In a network of PSPs, monitoring the flow of orders, status and capacity of an individual PSP, environment conditions (e.g., weather, transportation conditions, etc.), or other characteristics (e.g., labor strike, status of contract renewals, etc.) can provide important information to a PSP network controller (e.g., a monitoring controller).

Examples of a PSP operations management tool as disclosed herein may use hardware, associated programming, or a combination thereof, for example a monitoring controller and a digital processor. Hardware and associated programming will be described further below.

Figure 1:
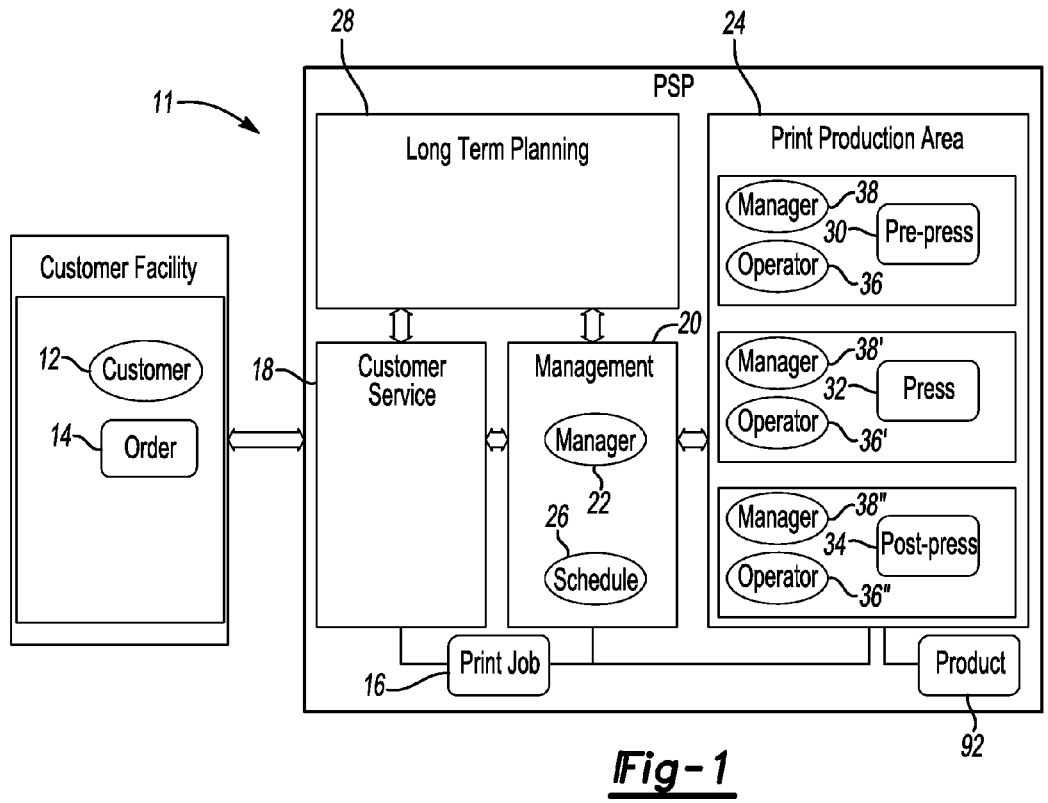
FIG. 1 is a schematic diagram depicting an example of a Print Service Provider (PSP) according to the present disclosure.

FIG. 1 is a block diagram depicting an example of a PSP 11. A customer 12 is also shown. The customer 12 may be an individual, a group of individuals, or an organization (e.g., non-profit, small business, corporation, etc.).

Although in some instances, the PSP 11 may not be best-suited to serve an individual, the PSP 11 may function to process print jobs for multiple individuals, such as, e.g., the customers of a large retailer, where the large retailer takes orders from the individuals (e.g., for photo calendars) and submits the order as a batch of individual customer orders to the PSP 11. In this illustration, the customer 12 is the large retailer submitting the order on behalf of many individuals. However, it is to be understood that the systems and methods described herein are not limited to any particular type of customer 12 or number of customers 12, and may also be used with individual customers 12 of the PSP 11.

In an example, the customer 12 creates the material to be printed (e.g., the photographs, brochures, course materials, periodicals, books, advertisements and product packaging), or works with a third-party provider to generate the material to be printed. The customer 12 then submits an order 14 including one or more materials for the PSP 11 to print, along with one or more print parameters. Print parameters may include various parameters, e.g., substrate stock, number of copies, due date, customer priority, and any special instructions (such as, e.g., laminating and quality level).

The PSP 11 receives the customer's order 14, and customer service 18 converts the order 14 to a print job 16. Customer service 18 may control acceptance of the order 14 and prevent the conversion of the order 14 to a print job 16. For example, customer service 18 may reject an order 14 if acceptance of the order 14 and conversion to a print job 16 would violate a quality of service agreement of another print job 16 that is running or in the queue. A print job 16 may include some or all of the print parameters from the order 14, and may further include one or more other parameters, such as a priority of the print job 16. The priority of the print job 16 may be the same as, or different from the customer priority specified by the customer 12. For example, meeting the due date may be assigned the same priority by the PSP 11 for the print job 16 as the priority assigned to the order 14 by the customer 12. However, the PSP 11 may assign another priority for completing the order 14 prior to the due date, which may be different from one customer 12 to the next (e.g., a repeat and high-volume customer 12 may receive a higher priority from the PSP 11 than a first-time or low-volume customer 12). The print job 16 may also include other parameters assigned by the PSP 11, for example, parameters based on current backlog and supplies in stock.

In addition to interfacing with the customer 12, customer service 18 also interfaces with management 20. For example, customer service 18 provides the print job 16 to the management 20 and communicates with the management 20 to ensure that customer expectations are met. Customer service 18 may also assign one or more parameters to the print job 16 based on feedback from the management 20.

Management 20 includes one or more managers 22 that are responsible for overseeing operations of the print production area 24, including production scheduling 26. Management 20 may communicate with long term planning 28. Long term planning 28 may include executive-level managers who may be responsible for site organization, process definition, finances, and growth strategy.

The print production area 24 may include a number of production operations, including pre-press production 30, press production 32, and post-press production 34. In an example having a Job Definition Format (JDF)-enabled workflow, job information and instructions are carried in a JDF format job ticket for digital systems, and in file folders for a non-digital part of the production. During pre-press production 30, the print job is converted to a predetermined format (e.g., an electronic bitmap file). During press production 32, the print job is printed on the printing machines. During post-press production 34, the print job is finished by laminating, cutting, collating, binding, sorting/binning, packaging, and shipping. Quality Analysis may also be implemented during one or more of the production operations. Each of the production operations 30, 32, 34 may include automatic processes and/or manual processes. In the case of either automatic processes or manual processes, human operators 36, 36', and 36" and human line managers 38, 38', and 38" may be respectively associated with production operations 30, 32, 34. Product 92 is an output of the print production area 24 and an ultimate output of the PSP 11. The product 92 may be delivered to the customer 12 or to a place designated by the customer 12.

In examples with a network of PSPs and also in examples with an individual PSP, data may be collected and analyzed to measure the health of the system, predict service level (cost and on-time deliveries of orders), identify potential bottlenecks, errors, and/or exceptions, and take steps to fix them. However, in some cases it may be difficult or too expensive (e.g., time in labor, risk of lengthier order lead time, etc.) to measure all the processes in a real world system. In either a network of PSPs or in an individual PSP, it is not evident where and when to collect data because of the stochastic nature of the orders and the presence of many product-flows that intertwine and change frequently.

Examples of methods and systems of the present disclosure provide use of a simulation platform as a tool for improving the data collection by simulating the various product flows and determining an effective and/or improved monitoring and data collection methodology or strategy. A module(s) (e.g., optimization module(s)) may then be used to determine effective and/or improved monitoring locations and/or effective monitoring frequencies of the respective effective monitoring locations or effective monitoring frequencies of selected monitoring locations. Therefore, it may be possible to minimize the number of active monitors or collect just enough data and just in time to inform decision-making. Further, it may be possible to insure a robust and flexible system while minimizing the implementation cost and upkeep.

It is to be understood that monitoring frequency in this context means how often information from a monitor is input into a system. For example, information from one monitor in the PSP may be input, for example 4 times per hour. However, information from another monitor may be input, for example, every 10 milliseconds. Some monitors may produce a continuous stream of information that is periodically "read" by the system. For example, a thermocouple will continuously produce a voltage proportional to the temperature of the couple, but may be read at a periodic rate, or at other predetermined intervals. In another example, a monitor may be read or activated when triggered by a condition that has been pre-determined in simulation(s) according to examples of the present disclosure. Other monitors may only provide information when activated or queried. For example, an RFID scanner may transmit timekeeping information when an employee enters a work area when the employee presents a badge to the RFID scanner. Further, a monitor may have a variable resolution or accuracy that can vary according to conditions. For example, an ink monitor may have better resolution as a monitored ink level gets lower. It is to be understood that the variable resolution or accuracy of a monitor may be selectable according to a condition that has been pre-determined in simulation(s) according to examples of the present disclosure.

PSP data collection may include jobs tracking and operational metrics. Some PSPs do some form of jobs tracking by, for example, using a paper trail or a digital storage solution. A paper trail may include a "job ticket" for a job that is composed of the job identification number, description, and an image of the job's cover or first page. This job ticket travels with the job through the entire manufacturing process. A digital storage solution may include a barcode printed at the margin of the printed sheets. A human operator may use a wireless barcode scanner to scan the barcode to inform the control management system (e.g., using a monitoring controller, discussed further below) of the fulfillment status of this particular job.

Some PSP operations fix issues as they arise, some record a limited quantity of information, and some use monitoring and tracking systems. Existing monitoring and tracking systems may have been developed initially by trial and error, or through past experience of hired contractors or the management. After the initial development, existing monitoring and tracking systems are used thereafter without significant change. This initial development process followed by substantially unchanged usage is found, e.g., in product finishing. The diversity of the finishing types and procedures results in a large set of different finishing equipment that is either manual or semi-manual. This set of equipment is generally mechanical equipment, and lasts for many years. Even though the print industry has been considering interface standardization through JDF/JMF (Job Definition Format/Job Messaging Format) for some time, the implementation of JDF/JMF at the finishing stage is largely absent. In some instances, this may result in ad-hoc practices leading to inconsistent and/or incomplete information collection. This collected data is generally not be used unless a significant problem arises and an investigation is carried out.

In contrast thereto, examples of the present disclosure provide an adaptive and robust monitoring and tracking solution. As used herein, "robust" is meant to include having the capability to accept a wide range of inputs such that a minimum number of failures occur. Also, as used herein, "adaptive" or "flexible" means capable of dynamic system control, including capability for making updates during production.

Monitored information may include operations data parameters (also referred to herein as operations data inputs) captured at PSP operations monitoring locations that may use one or more workflow monitors as monitors (including monitors for transport and storage for a more complete view). In one example, these workflow monitors are automatic and include electronic sensors, mechanical counters, or the like. Some examples of electronic sensors include, for example, infrared (IR), radio frequency (RF), near field communicator (NFC), radio frequency identification (RFID), barcode scanning, acoustic, and video sensors. In another example, the workflow monitors include input by a user. Information may also be obtained for any station that is of interest using a combination of automatic and manually obtained information.

Examples of operations data parameters/inputs include machine status, machine throughput, quantity of machines online/offline, print job scheduling, print job class, print job location in the PSP, pending service requests, general comments, special flags, machine parameters, historical data, employee status, employee throughput, total employees, employee experience, employee scheduling, and combinations thereof.

In addition to information from production, operations data inputs may also be obtained from the management 20 and/or long term planning 28, and may include real-time and/or historical data. Operations data inputs may also be obtained from incoming print jobs, outgoing print jobs, and customer feedback. Operations data inputs may be obtained for one or more PSP facility. Further, humans may identify operations data inputs for introduction into the operations management tool 10 (discussed further below, e.g., in FIGS. 2 and 3). All operations data inputs, whether retrieved by human or machine implement, may be operatively connected to the operations management tool 10.

Operation parameters involved in simulation and improvement as disclosed herein include two classes: the data (value given by its effect on the overall system); and the cost associated with measuring that data. Parameters may be identified, and then simulation, improvement, and analysis may follow. In an example of the tool 10 disclosed herein, a set of operation parameters includes a design space from which a set of production conditions is determined. The operation parameters may be determined/selected based upon various factors, including, e.g., vendor literature (e.g., typical pages/second for a particular type of job), historical operational experience, and/or the like. The historical operational experience may be determined, for example, from analysis of data, and/or anecdotally from human operators.

It is to be understood that the design space may include products, parts, equipment status, a list of potential monitoring locations, a range of allowable monitoring frequencies, targeted benefits (e.g., maximizing the probability of identifying a defect using a minimal monitoring frequency/number of samples), constraints, and/or the like, and/or combinations thereof. Additionally, the design space may include job characteristics such as: individual job classes, a portfolio of potential jobs within the capabilities of the system, and/or the like, and/or combinations thereof. Different job classes may require significantly different set-up characteristics that should be taken into account in the overall workflow. The production conditions may include any of a product mix, a resource configuration, and a data collection monitoring location structure.

Constraints may include rules relating to, e.g., order admission, production planning, job scheduling, exception handling, resource management, and combinations thereof. Exception handling rules may guide the responses to scrapped jobs, malfunctioning machines, etc. Some examples of exception handling rule responses include output inspection, rework routing, and fulfillment path recognition. Resource management rules may guide worker breaks, machine maintenance, consumable replenishment, etc. An example of a constraint may be that sampling activity should not negatively impact productivity.

As used herein, resources may include, money, materials, staff, and other assets that can be drawn on by the PSP in order to function. Examples of the present disclosure include a model for use in simulation. Examples of this model are developed including constituent parts to define a PSP operation printing system including PSP resources, product streams, operation policies, and orders. PSP resources are discussed above and include PSP assets with various capabilities, performance, stability, failure, costs, etc. Product streams, also known as fulfillment paths, include connectivity and ordering of a particular set of resources that completes a particular type of product. Operation policies include constraints (as discussed above) that impact the PSP model. Orders may include information related to the print jobs with an order handoff interface and description of the work, related digital files, due date, shipping, and payment information.

Subsequent to parameter definition/determination, the PSP operation may be simulated using example(s) of the model to determine a set of results. The set of results may include a monitoring strategy (also referred to herein as a data collection strategy) having effective and/or improved monitoring locations and/or effective monitoring frequencies of the respective effective monitoring locations or effective monitoring frequencies of selected monitoring locations.

The results may include a set of rules to apply during production. An example of a rule may be: if a throughput variance is above a set-point number, then increase the frequency of monitoring. A module (e.g., an optimization module) may be used to determine the effective and/or improved monitoring locations and/or the effective and/or improved monitoring frequencies of the respective effective monitoring locations or of the effective selected monitoring locations.

"Module" as used herein may be an assembly of electronic components and circuitry, that is installed as a unit; a portion of a program (including computer readable instructions) that, when executed, carries out a specific function and may be used alone or combined with other modules; or a combination thereof.

Examples of optimization programs (including computer readable instructions) executable in examples of the optimization module include genetic programs, simulated annealing, and metaheuristic programs (e.g., Tabu search). The set of results may be provided in output. Output may include printing on media, displaying on a display, or storing electronically. The set of results may be applied to the PSP operation by selectively activating or deactivating monitors disposed at the chosen effective and/or improved monitoring locations and/or implementing the chosen effective and/or improved monitoring frequency for each activated monitor.

Figure 2:
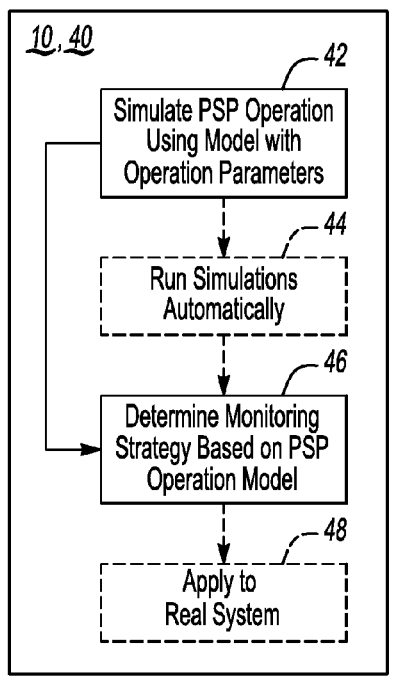
FIG. 2 is a flow diagram depicting an example of a static implementation of a PSP operations management tool according to the present disclosure.

FIG. 2 depicts a flow chart of examples of a static implementation 40 of PSP operations management tool 10. In an example (as shown in the solid line flow), static implementation 40 of tool 10 includes simulating a PSP operation using a model thereof with a set of selected operation parameters for performing the PSP operation. In other words, the set of operation parameters is determined, and the PSP operation model is prepared/generated using that set of selected operation parameters (as shown at box 42). A monitoring or data collection strategy, which may include a set of results/output, is determined/generated based on the simulated PSP operation. The determined set of results includes a data collection or monitoring strategy having effective and/or improved monitoring locations and/or respective effective and/or improved monitoring frequencies (as shown at box 46).

In an example, the monitoring strategy may be used for monitoring the PSP operation when performed in the printing system. The monitoring strategy may be determined by determining monitoring locations for effective monitoring of the PSP operation when performed in the printing system. Further, the monitoring strategy may be determined by determining effective monitoring frequencies associated with the respective monitoring locations.

In a further example (as shown in the dashed line flow), static implementation 40 of tool 10 includes running the simulations automatically (as shown at box 44). The results (including the monitoring strategy mentioned above) may be applied to a real system, for example, the PSP 11 (as shown at box 48). The monitoring or data collection strategy may be implemented by causing selective activation or deactivation of monitors disposed at effective monitoring locations. Further, the monitoring strategy may be implemented by causing implementation of an effective monitoring frequency for each activated monitor.

Figure 3:
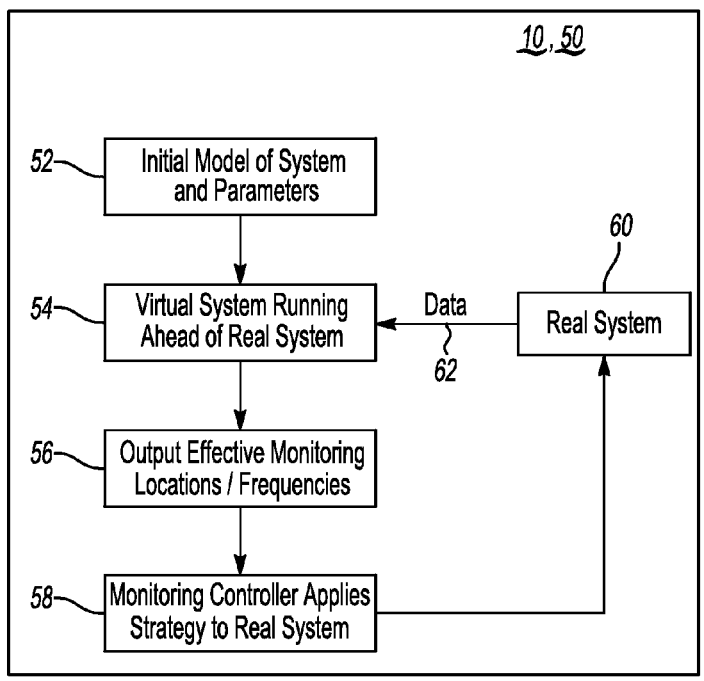
FIG. 3 is a flow diagram depicting an example of a dynamic implementation of a PSP operations management tool according to the present disclosure.

FIG. 3 depicts a flow chart of an example of a dynamic implementation 50 of PSP operations management tool 10. As shown at box 52, the model is prepared, including determining an appropriate set of operation parameters. As shown at box 54, a virtual system (e.g., a virtual PSP) operates, running ahead of the real system (shown at box 60), e.g., PSP 11. As shown at box 56, an output is generated of the monitoring strategy including effective and/or improved monitoring locations and/or effective monitoring frequencies of the respective effective monitoring locations or effective monitoring frequencies of selected monitoring locations. As shown at box 58, a monitoring controller applies the monitoring strategy from the output to the real system (shown at box 60). The monitoring controller (box 58) also may receive operations data from active monitors in the PSP operation. Data 62 (from the real system, box 60), including data similar to operations parameters, is fed into the virtual system (box 54). An output is then generated of an updated monitoring strategy including updated effective and/or improved monitoring locations and/or effective monitoring frequencies of the respective effective monitoring locations or effective monitoring frequencies of selected monitoring locations. In this way, a loop of continuous feedback is possible.

In examples of the present disclosure, the virtual system (box 54) operates far enough ahead of the real system (box 60) such that there is time for the real system (box 60) to implement changes from the virtual system output (box 56). For example, the simulation may run from about 15 minutes ahead of operation to about 2 days ahead of operation, depending on the inputs considered. In another example, the simulation may run from about 2 hours ahead of operation to about 1 day ahead of operation. In an example, management 20 may use a TAKT clock. TAKT is a mechanism for, e.g., a factory to bridge the stochastic demand arrival and smooth production flow at the factory floor. An operational decision may be made during a period of time called a TAKT window, which may be, for example, about 15 minutes. Simulation may be performed one TAKT window ahead of the real system (i.e., about 15 minutes ahead). In example(s) disclosed herein, there is enough time for the monitoring controller (box 58) to apply changes from the virtual system output (box 56) to the real system (box 60).

It is to be understood that the modeling and analysis as discussed herein may be accomplished using hardware, associated programming, or a combination thereof.

Figure 4:
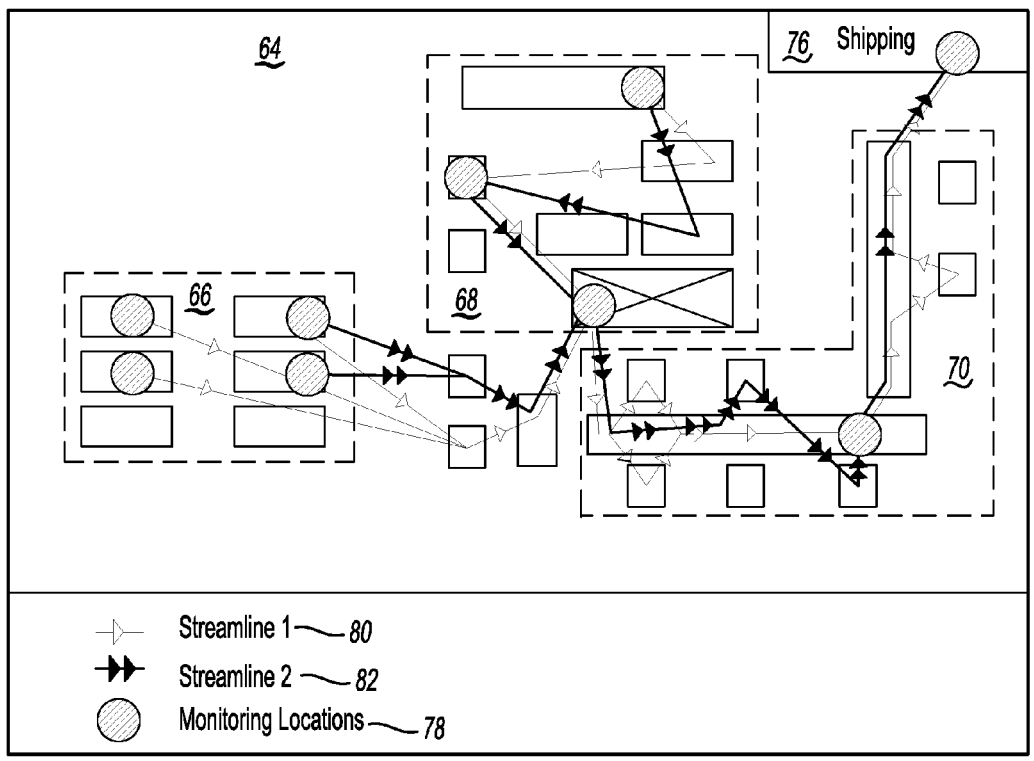
FIG. 4 is a schematic diagram depicting an example of a PSP operation and workflow with monitors according to the present disclosure.

FIG. 4 depicts an example of a PSP operation 64 according to the present disclosure. During the design phase of the PSP layout, the most common configuration(s) that the PSP will use are simulated in a model of the PSP operation using selected operation parameters. The PSP in FIG. 4 shows a generic layout of a PSP operation including a pre-press station 66, press station 68, and post-press station 70, as well as an area for shipping 76. Some examples of monitors/monitoring locations are identified by filled circles designated generally at 78. Process flows are referred to generically as streamline 1 (at 80), and streamline 2 (at 82).

Simulation of the PSP operation may be carried out using hardware, associated programming, or a combination thereof. In order to provide better definition of the system, the set of selected operation parameters is provided to the model for use in simulation. Simulation may include computational modeling utilizing, e.g., continuous time, discrete event, and finite state machine models of computation. A hierarchical component assembly design may enable heterogeneous mixtures of the machine models of computation. Database management and visualization tools may also be used in the simulation.

After simulation, the optimization module including an example of the optimization program may be used to determine effective and/or improved monitoring locations to monitor and track information based on the targeted benefits and constraints in the set of selected operation parameters. The simulation can be deployed to produce a range of solutions and provide a quantitative benefit/constraint metric to aid decision making. Examples of quantitative benefit/constraint metrics include cost vs. benefit ratio, price vs. robustness, etc. Further examples of quantitative benefit/constraint metrics include business-metrics such as return on investment (ROI), internal rate of return (IRR), and the like.

Figure 5:
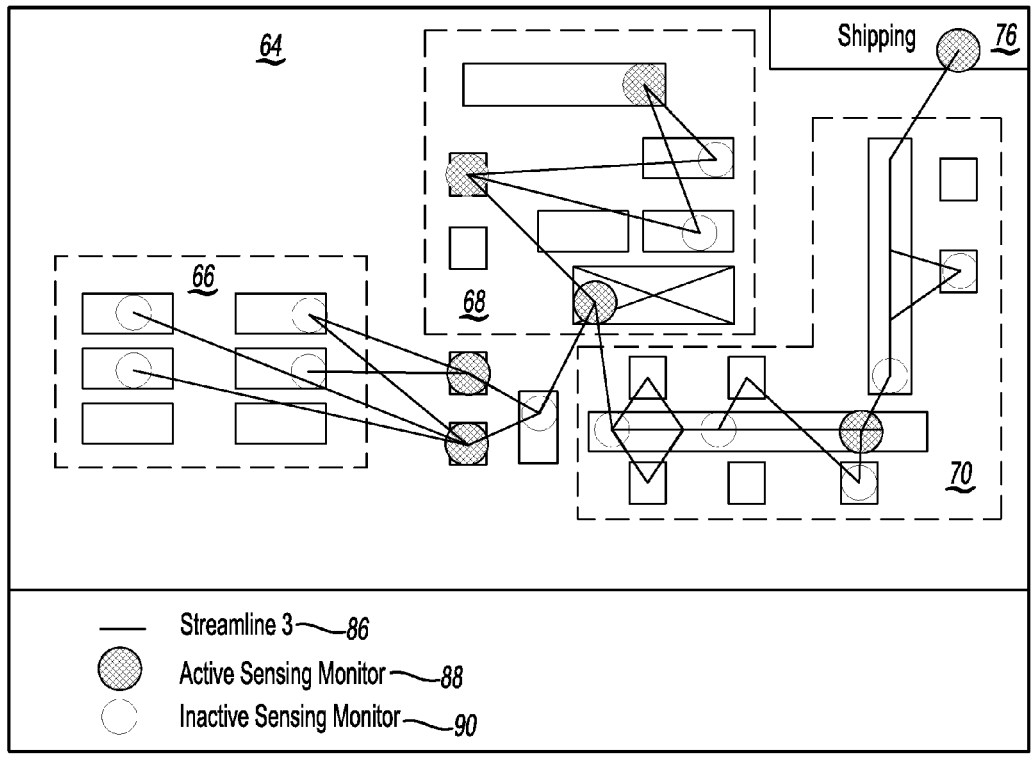
FIG. 5 is a schematic diagram depicting an example of a PSP operation and workflow with monitors, both active and inactive according to the present disclosure.

FIG. 5 depicts an example of a PSP operation 64 according to the present disclosure. In the example, physical monitors may be installed in locations to monitor the various configurations of the plant, (i.e., the design space). FIG. 5 is substantially similar to FIG. 4 except that some monitors are shown active and others inactive. A process flow is referred to generically as streamline 3 (at 86), similar to streamlines 1 (at 80) and 2 (at 82) of FIG. 4. During production operation of the PSP 11, for each configuration of the PSP 11 or for each product mix, appropriate monitors may be selectively activated or deactivated, including implementing a desired monitoring frequency for a respective selected monitor. Active monitors are depicted in FIG. 5 by a filled circle, as shown at 88, and inactive monitors are depicted by a hollow circle, as shown at 90.

For example, in a specific configuration and product type, only a particular monitoring location of a certain type at a specified point is needed. If simulation predicts that a resource is uncertain by running the simulation ahead of the real production, the monitoring of that resource may be increased dynamically (e.g., by increasing the frequency of monitoring).

Therefore, it is to be understood that the simulation according to examples as disclosed herein enables advanced diagnostics such that the tool 10 provides support for predictive intervention and preventative maintenance. For instance, examples of the tool 10 as disclosed herein provide the capability to deploy sensors or devices to monitor in a location that is then-currently not monitored, and/or to deploy a suitable sensor to a then-currently monitored location for more accurate monitoring (e.g., deploying a more suitable sensor to determine a potential problem).

As used herein, the term "advanced diagnostics" means identifying the nature of an undesirable situation that occurs before the undesirable situation occurs in reality. For example, by use of simulation, it may be possible to determine that a printer may run out of ink without warning and lead to scrap generation. Applying the information from simulation, the ink level monitoring frequency may be increased, or the monitoring resolution improved to more accurately predict when the ink will be depleted. In this manner, ink depletion may be prevented. The ink level example is a simple example for illustration of the term "advanced diagnostics".

Along with maintaining and improving active PSP operations (e.g., existing operations, in production), examples of the simulation disclosed herein may also be used to help design a PSP 11, whether for building a new operation or renovating an existing operation. Once the PSP 11 is built, examples of the simulation may be calibrated with actual data from the PSP 11. This part of examples of the disclosed tool 10 includes a systematic testing of each part of the PSP 11 to identify discrepancies between the design machine (as coded into the simulation) and the "as built" PSP 11. This calibration may be complicated, e.g., due to feedback loops in the print process. As such, sophisticated optimization methods may be suitable for resolving a calibration solution. Completion of this calibration step may improve the predictive nature of examples of the disclosed simulation to be used in a real-time mode during production operation of the PSP 11.

It is to be understood that the techniques discussed herein may be applied to a network of PSPs 11. That is, in addition to improving data collection (e.g., monitoring) for the operation of a particular PSP 11 and allocating resources therein, the improvement of data collection may be made for multiple PSPs 11 (e.g., a network of PSPs 11) in a set geographical region, such as a city, a county, a state, a group of states, a country, or a set of countries. For example, data collection improvement across the network of PSPs 11 may inform job scheduling by using a scheduling program (including computer readable instructions) to review a set of properties for a set of jobs and allocate the jobs across the PSPs 11 in the selected PSP 11 network. Quality requirements for a job relative to PSP 11 capabilities may also be considered in job allocation and improvement. In this way, data collection and resources may be balanced or allocated effectively and efficiently across all the PSPs 11 in the network. Improvement results may be applied to the PSP network by selecting which PSPs to utilize to complete various jobs. As a simple example, one PSP may be low on supply of a particular type of paper, and another location may have ready-access to a supply for that type of paper. A monitoring controller would then reroute the print job to the location with ready-supply, avoiding risk of delay due to a shortage of supplies.

While not shown, the tool 10 may also include peripheral device adapters that provide an interface to input devices and output devices to create a user interface and/or to access external sources of memory storage. An input device (e.g., keyboard or keypad, mouse, touchscreen, etc.) may be provided to allow a user to interact with the tool 10. The peripheral device adapter may also create an interface between a processor 102, 102' (discussed further below) and a printer, a display device, or another output device.

The PSP operations management tool 10 may be part of a stand-alone server or workstation, or the PSP tool 10 may be part of a cloud computing system 96 (discussed further below). When part of a cloud computing system 96, the tool 10 may be owned and/or operated, e.g., by a print service provider who offers printing as a service to its clients. The "cloud" is a computer network accessible over the Internet and/or web that is dynamically scalable with virtualized resources, such as printing resources. In an example, the cloud may or may not be physically distributed. The user of the PSP tool 10 is not required to have knowledge or expertise in the infrastructure of the cloud that relies on the Internet to satisfy his/her printing needs. The cloud provides the services of the PSP tool 10 that are accessible from a web browser, while computer readable instructions and data may be stored on servers in the cloud.

In still another example, for a network of PSPs 11 (or similarly for an individual PSP 11), there may be variation in data collected in the PSP health, status, and current capacity. If use of examples of the PSP operations management tool 10 predicts that on-time delivery is potentially at risk, or that the conditions in the PSP 11 have changed, it can either increase the monitoring frequency (e.g., by collecting data more frequently for a specific monitoring location) or request/collect additional information (e.g., by activating additional monitors) for a more detailed operational state. It is to be understood that on-time means according to a production schedule (e.g., a predetermined target schedule), for instance to meet a delivery commitment to a customer.

Figure 6:
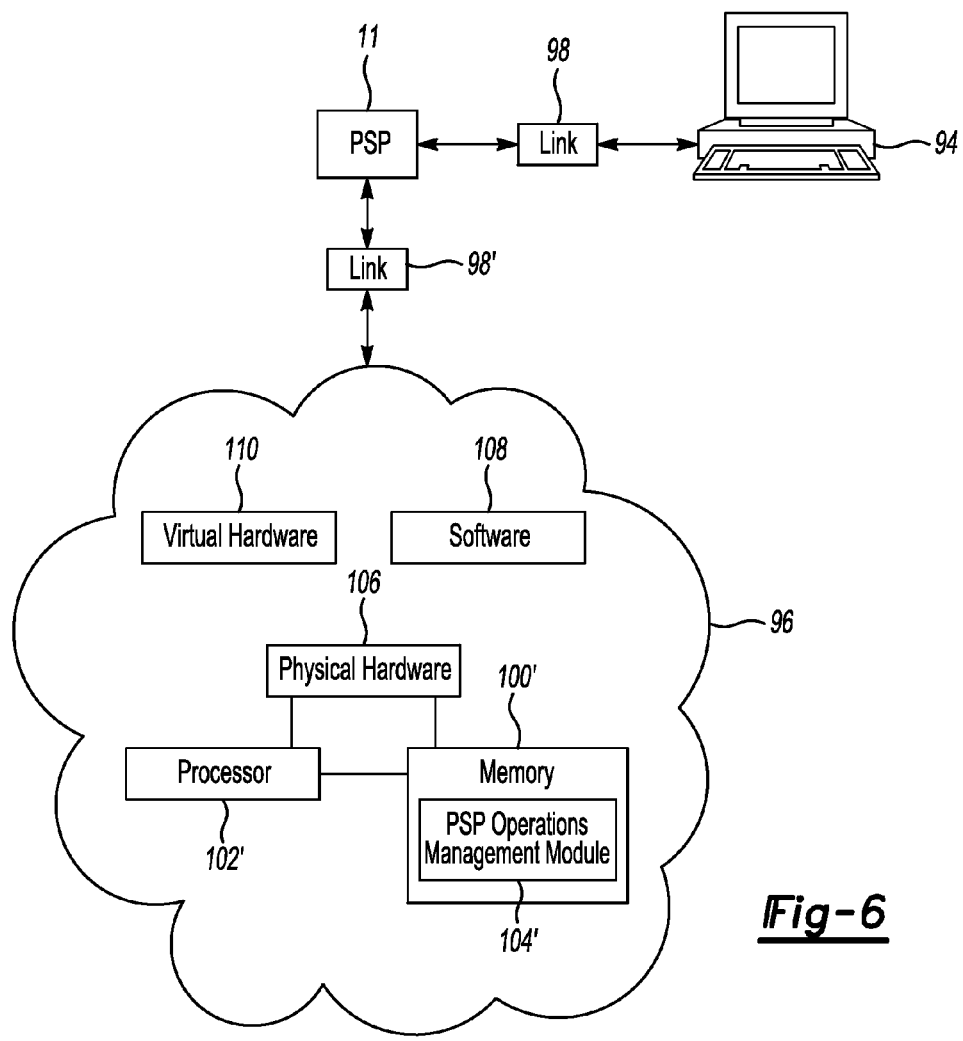
FIG. 6 is a semi-schematic view of an example of a PSP operation, where examples of a PSP operations management tool as disclosed herein are implemented as part of any of a local system, a remote system, and a cloud computing system.

In the foregoing discussion, various components have been described as combinations of hardware and programming. These components may be implemented in a variety of fashions. FIG. 6 illustrates examples of the implementation of these components. As illustrated in FIG. 6, the PSP 11 may be operatively connected to a local or remote computing system 94 via a link 98, or to a cloud computing system 96 via a link 98', or to both systems 94, 96. It is to be understood that the local or remote computing system 94 may include one or more standalone computing systems 94 and/or a network of computing systems 94. The links 98, 98' may be one or more of cable, wireless, fiber optic, or remote connections via a telecommunication link, an infrared link, a radio frequency link, or any other connectors or systems that provide electronic communication. Links 98, 98' may include, at least in part, an intranet, the Internet, or a combination of both. The links 98, 98' may also include intermediate proxies, routers, switches, load balancers, and the like.

The computing system 94 may be any personal computer, portable computer, content server, a network PC, a personal digital assistant (PDA), a cellular telephone or any other computing device that is capable of performing the functions for receiving input from, and/or providing control or driving output to the monitors, controllers, etc. (as described in connection with FIGS. 1-5) associated with examples of the PSP operations management tool 10 as disclosed herein.

Figure 7:
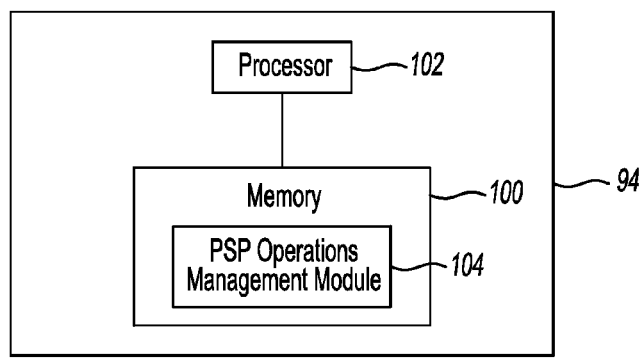
FIG. 7 is a schematic depiction of an example of programming and hardware that may be used to implement examples of a PSP operations management tool as disclosed herein.

As illustrated in FIGS. 6 and 7, the programming may be processor executable instructions stored on non-transitory, tangible memory media 100, 100', and the hardware may include a processor 102, 102' for executing those instructions. In an example, the memory 100, 100' stores program instructions that, when executed by respective processors 102, 102', implement PSP operations management module 104, 104' so as to implement examples of the PSP operations management tool 10 as disclosed herein. The PSP operations management module 104, 104' represents examples of these program instructions.

It is to be understood that the memory 100, 100' may be integrated in the same device as the respective processors 102, 102', or it may be separate from, but accessible to the respective computing system 94, 96 and processor 102, 102'.

In an example, the program instructions may be part of an installation package that can be executed by the respective processors 102, 102' to implement the PSP operations management module 104, 104'. In these instances, the memory 100, 100' may be a portable medium, such as a compact disc (CD), a digital video disc (DVD), or a flash drive; or the memory 100, 100' may be a memory maintained by a server from which the installation package can be downloaded and installed on the respective computing systems 94, 96. In another example, the program instructions may be part of an application or applications already installed on the respective computing systems 96, 96. In this other example, the memory 100, 100' may include integrated memory, such as a hard drive.

As used herein, the cloud computing system 96 refers to a computing system including multiple pieces of hardware operatively coupled over a network so that they can perform a specific computing task. The cloud 96 may include a combination of physical hardware 106, software 108, and virtual hardware 110. The cloud computing system 96 is configured to (i) receive requests from the computing system 94 (or from users using the computing system 94), and (ii) return request responses. As examples, the cloud computing system 96 may be a private cloud, a public cloud or a hybrid cloud. Further, the cloud 96 may be a combination cloud computing system including a private cloud (or multiple private clouds) and a public cloud (or multiple public clouds).

The physical hardware 106 may include, among others, processors, memory devices, and networking equipment. The virtual hardware 110 is a type of software that is processed by the physical hardware 106 and designed to emulate specific hardware. As an example, virtual hardware 110 may include a virtual machine (VM), i.e., a software implementation of a computer that supports execution of an application like a physical machine. An application, as used herein, refers to a set of specific instructions executable by a computing system for facilitating carrying out a specific task. For example, an application may take the form of a web-based tool providing users with a specific functionality, e.g., running a remote collaboration meeting. It will be understood that an application as used herein is not limited to a remote collaboration application, but refers to an application supporting performing a specific task using computing resources such as, among others, enterprise applications, accounting applications, multimedia related applications, or data storage applications. Software 108 is a set of instructions and data configured to cause virtual hardware 110 to execute an application. As such, the cloud computing system 96 can render a particular application available to users associated with PSP 11.

Executing an application in the cloud 96 may involve receiving a number of requests, processing the requests according to the particular functionality implemented by the application, and returning request responses to the requesting computing system 94. For executing the application, the resources (e.g., physical hardware 106, virtual hardware 110, and software 108) of the cloud computing system 96 may be scaled depending on the demands posed on the application. For example, cloud 96 may vary the size of the resources allocated to the application depending on the number of requests, the number of users interacting with the application, or requirement on the performance of the application (e.g., a maximum response time). While not shown, it is to be understood that the cloud 96 may also include an interface that allows the computing devices 94 to communicate with the components of the cloud 96.

Referring still to FIG. 6, the physical hardware 106 of the cloud computing system 96 may include a processor 102' and memory 100'. The processor 102' may be any processor that is capable of executing program instructions stored in the memory 100' to implement, for example, PSP operations management module 104' so as to implement examples of the PSP operations management tool 10 as disclosed herein. The memory 100' may include an operating system and applications, such as a PSP operations management application. The operating system may be a collection of programs that, when executed by the processor 102', serves as a platform on which the PSP operations management application can run. Some examples of operating systems include various versions of Linux® and Microsoft Windows®.

In the cloud computing system 96 of FIG. 6, the PSP operations management module 104' may have the hardware portions implemented as the processor 102' and may have the programming portions implemented as the operating system and applications. As such, the computing system(s) 94 may utilize the services of the cloud 96 to achieve remote collaboration.

The figures set forth herein aid in depicting various architectures, functionalities, and operations of the examples disclosed herein. Throughout the description, many of the components are defined, at least in part, as programs, programming, or program instructions. Each of these components, portions thereof, or various combinations thereof may represent in whole or in part a module, segment, or portion of code that includes one or more executable instructions to implement any specified logical function(s). Each component or various combinations thereof may represent a circuit or a number of interconnected circuits to implement the specified logical function(s).

The examples disclosed herein may be realized in any non-transitory, tangible computer-readable media for use by or in connection with an instruction execution system (e.g., computing systems 94, 96), such as a computer/processor based system, or an ASIC (Application Specific Integrated Circuit), or another system that can fetch or obtain the logic from computer-readable media and execute the instructions contained therein. Non-transitory, tangible computer-readable media may be any media that is capable of containing, storing, or maintaining programs and data for use by or in connection with the computing systems 94, 96. Computer readable media may include any one of many physical media such as, for example, electronic, magnetic, optical, electromagnetic, or semiconductor media. More specific examples of suitable computer-readable media include a portable magnetic computer diskette such as floppy diskettes or hard drives, a random access memory (RAM), a read-only memory (ROM), an erasable programmable read-only memory (EPROM), or a portable CD, DVD, or flash drive.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

It is to be understood that ranges provided herein include the stated range and any value or sub-range within the stated range. For example, a range from about 15 minutes to about 2 days should be interpreted to include not only the explicitly recited limits of about 15 minutes to about 2 days, but also to include individual values, such as 20 minutes, 90 minutes, 18 hours, 30 hours, etc., and sub-ranges, such as from about 75 minutes to about 20 hours, from about 90 minutes to about 1 day, etc. Furthermore, when "about" is utilized to describe a value, this is meant to encompass minor variations (up to +/−15%) from the stated value.

While several examples have been described in detail, it will be apparent to those skilled in the art that the disclosed examples may be modified. Therefore, the foregoing description is to be considered non-limiting.

What is claimed is:

1. A computer software product, comprising:

a non-transitory, computer-readable medium having embedded therein instructions executable by a processor, the instructions to:
   simulate dynamic operation of a print service provider (PSP) having a changing plurality of workflow streamlines using a model of a printing system with a set of operation parameters for performing the PSP operation;
   determine a monitoring strategy based on the simulated PSP operation, the monitoring strategy for monitoring the PSP operation when performed in the printing system;
   determine the monitoring strategy by determining monitoring locations based on an effectiveness of the monitoring of the PSP operation when performed in the printing system; and
   determine the monitoring strategy by determining monitoring frequencies based on the effectiveness of the monitoring, the monitoring frequencies associated with the respective monitoring locations, wherein the effectiveness of the monitoring is based on a subset of targeted benefits and constraints in the set of operation parameters.

2. The product as defined in claim 1 wherein the instructions cause implementation of the monitoring strategy by including instructions to:
   i) cause selective activation or deactivation of monitors disposed at the determined monitoring locations, ii) cause deployment and activation of an other monitor at a then-currently not monitored location, iii) cause selection, deployment and activation of a different monitor to a then-currently monitored location, or iv) a combination of any of i), ii), and iii); and
   cause implementation of the determined monitoring frequency for each activated monitor.

3. The product as defined in claim 1 wherein the set of operation parameters includes a design space from which a set of production conditions is determined, the design space including products, parts, equipment status, a list of potential monitoring locations, a range of allowable monitoring frequencies, individual job classes, a portfolio of potential jobs within the capabilities of the system, targeted benefits, and constraints, and wherein the set of production conditions includes at least one of a product mix, a resource configuration, a data collection monitoring location structure, or combinations thereof.

4. The product as defined in claim 1 wherein the model includes operations data parameters including machine status, machine throughput, machines online, machines offline, print job scheduling, print job class, print job location in the PSP, pending service requests, general comments, special flags, machine parameters, historical data, employee status, employee throughput, total employees, employee experience, and employee scheduling.

5. The product as defined in claim 1 wherein the PSP operation is associated with a single PSP.

6. The product as defined in claim 1 wherein the PSP operation is any of:
   an active operation to be maintained;
   a newly developed operation; or
   an existing operation to be renovated.

7. The product as defined in claim 1 wherein the instructions are further to identify a nature of a potentially undesirable situation prior to an actual occurrence in the PSP operation.

8. The product as defined in claim 1 wherein the PSP operation is associated with a network of PSPs in different spaced locations.

9. A system of collecting data for a print service provider (PSP), the system comprising:
   a PSP operations management module including computer readable instructions that, when executed by a processor, carry out a specific function to:
      model operation of the PSP wherein the PSP has a changing plurality of workflow streamlines, the model using a set of operation parameters;
      output a set of results based on the model, the set of results including a monitoring strategy having monitoring locations selected based on an effectiveness of the monitoring, and monitoring frequencies determined based on the effectiveness of the monitoring, the monitoring frequencies being associated with the selected monitoring locations;
      apply the set of results to the PSP operation by selectively activating or deactivating monitors disposed at the selected monitoring locations; and
      implement the determined monitoring frequency for an activated monitor, wherein the effectiveness of the monitoring is based on a subset of targeted benefits and constraints in the set of operation parameters.

10. The system as defined in claim 9 wherein the PSP operations management module is further to:
   monitor the PSP operation and receive operations data from the activated monitors in the PSP operation, the operations data to be input into the model to update the model.

11. The system as defined in claim 9 wherein the PSP operations management module includes a module to select the monitoring locations based on the effectiveness of the monitoring and to determine the monitoring frequencies based on the effectiveness of the monitoring.

12. The system as defined in claim 9 wherein the PSP is a single PSP or a network of a plurality of PSPs in different spaced locations.

13. The system as defined in claim 9 wherein the PSP operations management module is further to design a new PSP operation.

14. The system as defined in claim 9 wherein the PSP operations management module is further to maintain an existing PSP operation.

15. A method of collecting data for a print service provider (PSP), the method comprising:
   simulating operation of the PSP wherein the PSP has a changing plurality of workflow streamlines;
   determining a data collection strategy based on the simulated PSP operation, the data collection strategy for retrieving data during a PSP operation when performed in a printing system; and
   applying the data collection strategy to the PSP operation when performed in the printing system by:
      a) i) selectively activating or deactivating monitors disposed at monitoring locations selected based on an effectiveness of the monitoring, ii) deploying and activating an other monitor at a then-currently not monitored location, iii) selecting, deploying and activating a different monitor to a then-currently monitored location, or iv) a combination of any of i), ii), and iii); and
      b) implementing a monitoring frequency determined based on the effectiveness of the monitoring for each activated monitor;

wherein the method is executed by a processor according to instructions in a non-transitory, tangible computer-readable medium, and wherein the effectiveness of the monitoring is based on a subset of targeted benefits and constraints in a set of operation parameters.

16. The method as defined in claim 15 wherein the simulated PSP operation uses the set of operation parameters, including: a design space to determine a set of production conditions, the design space including products, parts, equipment status, a list of potential monitoring locations, a range of allowable monitoring frequencies, individual job classes, a portfolio of potential jobs for the system, targeted benefits, and constraints, and wherein the set of production conditions includes a product mix, a resource configuration, a data collection monitoring location structure, or combinations thereof.

17. The method as defined in claim 15, further comprising:
monitoring the PSP operation when performed in the printing system; and
receiving operations data from active monitors in the PSP operation, the operations data to be input into the simulated PSP operation.

18. The method as defined in claim 15, further comprising dynamically adjusting the determined monitoring frequency for each activated monitor.

* * * * *